INVENTOR
WILLIAM R. APBLETT
BY Richard H. Thomas
ATTORNEY

United States Patent Office 3,440,391
Patented Apr. 22, 1969

3,440,391
INTERNAL TUBE WELDING
William R. Apblett, Metuchen, N.J., assignor to Foster Wheeler Corporation, New York, N.Y., a corporation of New York
Continuation-in-part of application Ser. No. 531,953, Mar. 9, 1966. This application July 11, 1966, Ser. No. 564,211
Int. Cl. B23k 9/02
U.S. Cl. 219—137  6 Claims

ABSTRACT OF THE DISCLOSURE

A method for welding tubes to a tube sheet including the steps of forming a hole through the tube sheet with a socket of a depth in one surface so as to leave a tube thickness approximately equal to the thickness of the tube, thereby resulting in a tube and tube sheet substantially equal weld thickness then telescoping the tube within the socket and fusion welding the tube to the tube sheet within the inside diameter of the tube and tube sheet hole along the zone of abutment of the tube end and socket base.

---

Figure 1:
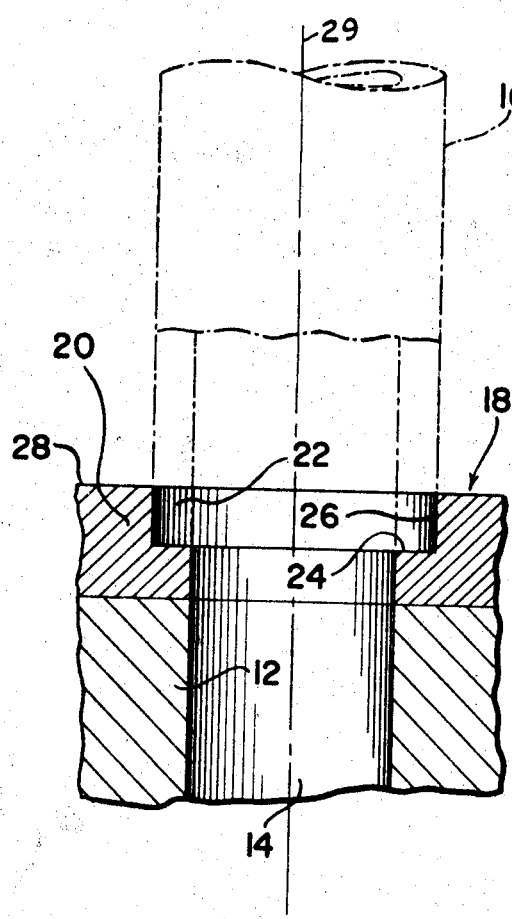

This application is a continuation-in-part of application Ser. No. 531,953, now abandoned filed Mar. 4, 1966 by W. R. Apblett.

This invention relates to welding of tubes to tube sheets by the use of internal tube fusion arc welding.

Present day heat exhcanger designs of the shell and tube type frequently require welding a large number of small and closely pitched tubes to a tube sheet, in alignment with holes in the latter, and techniques have been developed for this purpose, butt-welding tubes to the tube sheet using a welding torch adapted to be inserted through the tube sheet holes. The butt-welding technique has the advantage that it enables use of a thinner tube sheet even when the pressure within the tube sheet is high.

The butt-welding procedure frequently used involves machining short tubular extensions or spigots on the tube sheet around each hole, and the tubes are connected or butt-welded to the extensions. A primary disadvantage with this particular method is that a substantial expense is involved in forming the extensions.

As a further disadvantage, since the tube sheet is frequently a forging, laminations which occur in the base metal during the forging step show up in the extensions or spigots when the latter are formed. It is not infrequent that the laminations are a source of leakage.

A further disadvantage in welding tubes to extensions resides in the requirement that the weld joint be submerged in flux to prevent contact of air with the weld and oxidation of the weld metal. This requirement in turn means that the welding must be accomplished with the tubes and the tube sheet unit vertically oriented so that flux can be piled around the weld joint, and the difficulty results that most shops and crane installations are incapable of handling the extremely large units in a vertical position.

Another disadvantage with the usual butt welds is that they are less ductile than the parent metal, and vibration in the unit carried in the weld joint has been known to cause fatigue failure of the weld joint.

These and other disadvantages are overcome in accordance with the invention, in the steps of first forming a socket of predetermined depth in one surface of the tube sheet around each tube sheet hole. Tubes are inserted or telescoped within the sockets until the ends of the tubes abut the base of the sockets. The sockets and tube sheet holes are dimensioned so that the diameters of the sockets and holes substantially equal the outside and inside diameters respectively of the tubes. Following this, the tubes are fusion welded to the tube sheet along the zone of abutment of the tube end and socket base by means of an internal tube welding device. The fusion penetrates radially into the tube sheet beyond the surface of the tube sheet socket, and axially to a point close to but removed from the tube sheet outside surface, thereby defining an unfused shoulder of the tube sheet next to the outside surface and between the surface and area of fusion. The area of fusion however is sufficiently close to the tube sheet surface to avoid excessive corrosion between the shoulder and tube.

Figure 2:
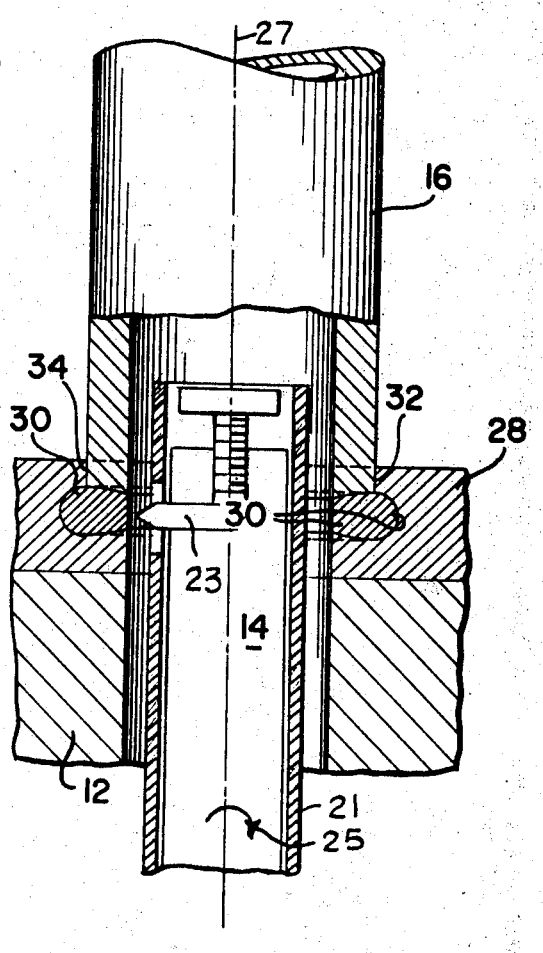
Figure 3:
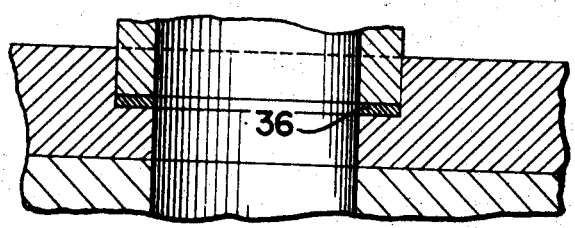

The invention and advantages thereof will become apparent upon consideration of the following description and accompanying drawing, in which:

FIGURE 1 illustrates a tube sheet and tube placement in accordance with the invention prior to fusion welding, FIGURE 2 represents the tube and tube sheet connection of FIG. 1 following fusion welding, and FIGURE 3 represents a modification of the invention of FIG. 1.

Referring to the drawings, a heat exchanger tube sheet 12 is provided with at least one hole 14 the diameter of which is equal to the inside diameter of a tube 16 to be attached to the tube sheet 12. In this example, the shell side 18 of the tube sheet is provided with a low carbon steel cladding 20, which offers greater ductility for tube attachment. The tube sheet base 12 is a high carbon steel forging of high strength, but is less ductile and less satisfactory for tube attachment.

In preparation for welding, the tube 16 is cleaned to remove dirt and oxide films, and the hole 14 is drilled and reamed in the area of shell side surface 18 to provide a shallow socket 22 adapted to receive an end of tube 16. The socket 22 has an enlarged diameter approximately equal to the outside diameter of tube 16 and defines an annular seat or base 24 which abuts the end of tube 16, and a peripheral wall 26 which extends between the seat 24 and surface 28 of the tube sheet.

After the tube is inserted within the socket, with the inside surface of the tube aligned substantially with the inside of the hole, the tube 16 may be expanded if desired at the inserted end so that the tube is tightly held within the socket. However, as a general rule, the socket will be carefully machined so that the tube 16 makes a close fit with the wall 26 of the socket. This avoids changes in position of the tube and excessive movement beyond the desired alginment of the tube with the tube sheet hole, and provides for good transmission of welding heat into the tube sheet. An internal welding torch 21, of the type for example shown in Patent No. 3,084,243, granted Apr. 2, 1963 to Ronald William Gotch and assigned to assignee of the present application, is inserted in the hole 14 from the channel side of the tube sheet 12 so that an electrode 23 is positioned at about the point of abutment of the tube end and socket seat 24. The electrode 23 is of the non-consumable type, and is adapted to be rotated as shown by arrow 25 about its axis 27, which axis corresponds with an axis 29 of the hole 14 and tube 16. Welding heat from the electrode arc causes fusion of the tube end and tube sheet socket seat 22 with the fusion penetrating radially into the tube sheet, as shown in FIG. 2, forming weld connection 30. By making the socket a predetermined depth, the fusion penetrates axially towards the surface 28 only to a point removed from the surface but close to the surface, to form a shoulder 32 of unfused tube sheet metal adjacent the surface. This leaves a crevice 34 between the tube wall and socket inside surface extending from the outside of the tube sheet down to the weld 30, and it is a criteria of the invention that the crevice be sufficiently shallow to avoid corrosion. It is well known that corrosive particles or fluids can become lodged within deep crevices to cause corrosion, whereas in the present example, socket dimensions and weld conditions are selected so that the crevice is sufficiently shallow, preferably less than 1/16 of an inch, to avoid holding the amount of corrosive material which will create corrosion.

EXAMPLE

In an example in accordance with the invention, the cladding for the tube sheet is preferably about 1/4 inch and the tube sheet is drilled to the I.D. of 3/4 inch O.D. x 12 B.W.G. tubing. A socket having a depth of about 3/16 inch and a diameter of about 3/4 inch is formed around the tube sheet hole concentric with the hole, and a 3/4 inch O.D. tube end is inserted within the socket. The tube sheet is high carbon steel about .35% carbon for high strength, and the cladding is .12% low carbon steel for ductility. The tubes of carbon steel have carbon content of about .25%. The welding is effected with about 120–140 amps, fusing the tube to the cladding but leaving a shoulder adjacent the tube sheet surface and a crevice having a depth of about 1/32 of an inch.

The following is additional data for the welding step:

| | |
|---|---|
| Preflow of argon _____seconds__ | 5 |
| Arc length _____inch__ | [1] 0.045 |
| Rotation (85 secs.) and overlap (10 secs.) seconds__ | 95 |
| Delay time _____do____ | 20 |
| Total weld cycle time _____do____ | 120 |
| Argon flow _____ft.³/hr__ | 5 |

[1] 9–11 volts.

The advantages of the invention should now be apparent. Primarily, laminations which exist in the base metal will not result in leakage since, quite obviously, the leaks have no place to go.

Additionally, the welding can be affected horizontally with the unit on its side as the only shielding necessary is that of argon gas within the tube. Since oxygen does not reach the weld zone, no welding flux on the outside of the tube is necessary.

As a principal advantage, the collar or shoulder of unfused material prevents or reduces direct transmission of vibration and bending loads into the weld connection, resulting in a higher strength tube to tube sheet joint than has heretofore been achieved. Finally, it can be appreciated that the tube plate requires less weld preparation to insure a good joint, than was heretofore required.

The invention also has the advantage that when a tube has to be replaced, the replacement only requires machining out the weld joint from the inside. Heretofore, machining of a welding stub on the tube sheet was required, and the close-pitch of tubes in the tube sheet made the machining a difficult operation.

In the embodiment of FIG. 3, a ring insert 36 is disposed between the socket seat 24 and tube end for control of the chemistry of the weld connection and/or direction of the arc. Those skilled in the art can readily determine the composition and specific shape of the ring insert needed to obtain these results.

It has been stated that the tungsten electrode tip is positioned at about the point of abutment of the tube end and socket seat 24. In actual practice, the electrode, i.e., the centerline thereof, is positioned slightly inside of (slightly further removed from the tube sheet surface) the point of plane of abutment. The actual offset distance depends upon such factors as tube sheet and tube materials, and tube thickness, and in the above example an offset distance of about .045 inch appeared satisfactory. The purpose for the offset is to direct a greater part of the arc at the mass of metal more difficult to melt, i.e., the tube sheet, conversely, to avoid excessive melting of the tube.

Although the invention has been described with reference to specific embodiments many variations will be apparent to those skilled in the art within the spirit and scope of the invention as defined in the following claims.

What is claimed is:

1. A method of welding tubes to a tube sheet comprising the steps of:
   forming a hole through the tube sheet;
   forming a socket of a depth in one surface of the tube sheet around the hole, operably leaving a tube sheet thickness approximately equal to the thickness of the tube thereby resulting in a tube and tube sheet of substantially equal weld thickness;
   telescoping the tube within the socket until the end of the tube abuts the base of the socket, the diameters of the socket and hole being substantially equal to the outside and inside diameters respectively of the tubes;
   fusion welding the tube to the tube sheet along the zone of abutment of the tube end and socket base, the area of fusion penetrating radially into the tube sheet and axially to a point close to but removed from the tube sheet outside surface, thereby defining a shoulder of unfused tube sheet metal adjacent the tube sheet surface between the surface and area of fusion, the area of fusion however being sufficiently close to the tube sheet surface to avoid excessive corrosion between the shoulder and tube.

2. A method of welding tubes to a tube sheet comprising the steps of:
   forming a hole through the tube sheet;
   forming a socket of a depth operably leaving a tube sheet thickness approximately equal to the thickness of the tube thereby resulting in a tube and tube sheet of substantially equal weld thickness and a socket diameter of a larger diameter than the hole at one end thereof, the socket defining a flat annular seat facing outwardly relative the hole and a cylindrical surface extending parallel to the hole axis between the seat and tube sheet surface;
   telescoping the tube within the socket until the end of the tube abuts the seat, the diameter of the socket and inside diameter of the hole being substantially equal to the outside and inside diameters respectively of the tube;
   fusion welding the tube to the tube sheet along the zone of abutment of the tube end and socket base, the area of fusion penetrating radially into the tube sheet and axially to a point close to but removed from the tube sheet outside surface, thereby defining a shoulder of unfused tube sheet metal adjacent the tube sheet surface between the surface and area of fusion, the area of fusion however being sufficiently close to the sheet surface to avoid excessive corrosion between the shoulder and tube; applying inert gas shielded arc welding heat by means of a rotatable welding tool inserted through the tube sheet internally around the zone of abutment of the seat and tube end fusing with the welding heat the metal in the abutting parts;
   the fusion progressing and penetrating into the tube sheet radially beyond the socket cylindrical surface and axially to a point close to but removed from the outside surface of the tube sheet,, thereby defining an unfused shoulder of the tube sheet next to the surface thereof abutting an unfused outside of the tube, the weld area being however sufficiently close to the surface to avoid corrosion between the shoulder and tube.

3. A method of welding tubes to a tube sheet comprising the steps of:
   forming a hole through the tube sheet;
   forming a socket of a depth operably leaving a tube sheet thickness approximately equal to the thickness of the tube thereby resulting in a tube and tube sheet of substantially equal weld thickness and a socket diameter of a larger diameter than the hole at one end thereof, the socket defining an annular seat facing outwardly relative the hole and a peripheral surface extending outwardly between the seat and tube sheet outside surface;

telescoping the tube within the socket until the end of the tube abuts the seat, the diameter of the socket and inside diameter of the hole being substantially equal to the outside and inside diameters respectively of the tube;

fusion welding the tube to the tube sheet along the zone of abutment of the tube end and socket base, the area of fusion penetrating radially into the tube sheet and axially to a point close to but removed from the tube sheet outside surface, thereby defining a shoulder of unfused tube sheet metal adjacent the tube sheet surface between the surface and area of fusion, the area of fusion however being sufficiently close to the tube sheet surface to avoid excessive corrosion between the shoulder and tube;

the fusion progressing and penetrating into the tube sheet radially beyond the socket peripheral surface and axially to a point close to but removed from the outside surface of the tube sheet, thereby defining an unfused shoulder portion of the tube sheet abutting an unfused outside of the tube, the weld being however sufficiently close to the surface to avoid corrosion between the shoulder and tube.

4. A method of welding tubes to a tube sheet comprising the steps of:

forming a hole through the tube sheet, the hole having an axis;

enlarging said hole at an end thereof to form an enlarged hole portion including an annular seat facing outwardly of the hole and a surrounding enlarged diameter surface extending axially from the seat to the outside of the hole, the enlarged hole portion penetrating a depth within the tube sheet, operably leaving a tube sheet thickness approximately equal to the thickness of the tube thereby resulting in a tube and tube sheet of substantially equal weld thickness;

telescoping the tube within said enlarged hole portion until the end of the tube abuts said seat, the diameter of said enlarged hole portion and the inside diameter of the hole being substantially equal to the outside and inside diameters respectively of the tube;

fusion welding the tube to the tube sheet along the zone of abutment of the tube end and socket base, the area of fusion penetrating radially into the tube sheet and axially to a point close to but removed from the tube sheet outside surface, thereby defining a shoulder of unfused tube sheet metal adjacent the tube sheet surface between the surface and area of fusion, the area of fusion however being sufficiently close to the tube sheet surface to avoid excessive corrosion between the shoulder and tube;

said fusion progressing and penetrating radially beyond said surrounding enlarged diameter surface and axially relative the predetermined depth of the enlarged hole portion to a point close to but removed from the outside of the tube sheet the depth of the enlarged hole portion being determined by the amount of metal fused whereby an unfused shoulder remains at the surface of the tube sheet abutting the outside of the tube but being sufficiently shallow.

5. A method according to claim 1 wherein a ring of predetermined composition is disposed between the tube end and base of the socket to control the chemistry of the fusion weld and/or direction of the arc.

6. A method according to claim 2 wherein the welding arc is directed along a line slightly inside of the socket annular seat whereby more heat is applied to the tube sheet mass than the tube end.

References Cited

UNITED STATES PATENTS

| | | | |
|---|---|---|---|
| 1,857,526 | 5/1932 | Burnish | 219—137 |
| 2,011,719 | 8/1935 | Kidd | 219—137 |
| 2,996,600 | 8/1961 | Gardner et al. | 219—137 X |
| 3,118,052 | 1/1964 | Lippart et al. | 219—137 |

RICHARD M. WOOD, *Primary Examiner.*

C. L. ALBRITTON, *Assistant Examiner.*

U.S. Cl. X.R.

219—125